(12) United States Patent
Fraser et al.

(10) Patent No.: US 7,055,551 B2
(45) Date of Patent: Jun. 6, 2006

(54) FLEXIBLE PIPE AND METHOD OF MANUFACTURING SAME

(75) Inventors: Dana Fraser, Panama City, FL (US); Robert G. Hoefling, Panama City, FL (US); Mark D. Kalman, Panama City, FL (US); Alan I. McCone, San Francisco, CA (US)

(73) Assignee: Wellstream International Limited, Newcastle Upon Tyne (GB)

( * ) Notice: Subject to any disclaimer, the term of this patent is extended or adjusted under 35 U.S.C. 154(b) by 0 days.

(21) Appl. No.: 10/165,870

(22) Filed: Jun. 10, 2002

(65) Prior Publication Data

US 2002/0144745 A1 Oct. 10, 2002

Related U.S. Application Data

(63) Continuation of application No. 09/706,070, filed on Nov. 3, 2000, now abandoned.

(60) Provisional application No. 60/163,908, filed on Nov. 5, 1999.

(51) Int. Cl.
*F16L 11/00* (2006.01)

(52) U.S. Cl. ........................ 138/132; 138/134; 138/135

(58) Field of Classification Search ................ 138/124, 138/125, 126, 127, 130, 135, 121, 122, 104, 138/144, 137; 72/365.2, 366.2, 338
See application file for complete search history.

(56) References Cited

U.S. PATENT DOCUMENTS

| 746,630 | A | | 12/1903 | Greenfield |
| 2,256,386 | A | * | 9/1941 | Farrar et al. ................ 138/131 |
| 2,859,149 | A | | 11/1958 | Straumann |
| 3,311,133 | A | * | 3/1967 | Kinander .................... 138/136 |
| 3,441,057 | A | | 4/1969 | Clement et al. |
| 3,585,540 | A | | 6/1971 | Schuttloffel et al. |
| 3,687,169 | A | | 8/1972 | Reynard |
| 3,890,181 | A | | 6/1975 | Stent et al. |
| 4,275,491 | A | | 6/1981 | Marinucci |
| 4,285,534 | A | | 8/1981 | Katayama et al. |
| 4,344,462 | A | | 8/1982 | Aubert et al. |
| 4,403,631 | A | * | 9/1983 | Abdullaev et al. .......... 138/130 |
| 4,549,581 | A | | 10/1985 | Unno et al. |
| 4,706,713 | A | | 11/1987 | Sadamitsu et al. |
| 4,903,735 | A | * | 2/1990 | Delacour et al. ........... 138/133 |
| 5,174,685 | A | | 12/1992 | Buchanan |
| 5,314,210 | A | | 5/1994 | Calmettes et al. |
| 5,406,984 | A | | 4/1995 | Sugier et al. |
| 5,579,809 | A | | 12/1996 | Millward et al. |
| 5,626,044 | A | * | 5/1997 | Lara-Castro ................. 72/203 |
| 5,638,714 | A | * | 6/1997 | Ryan et al. ................. 72/11.4 |
| 5,667,008 | A | | 9/1997 | Moore |

(Continued)

FOREIGN PATENT DOCUMENTS

EP 0 429 357 A1 5/1991

(Continued)

OTHER PUBLICATIONS

European Patent Office, "Communication—Supplemental European Search Report," Apr. 7, 2004, 4 pages. 978374.7.

*Primary Examiner*—James Hook
(74) *Attorney, Agent, or Firm*—Klarquist Sparkman, LLP

(57) ABSTRACT

A flexible pipe and a method of manufacturing same according to which the pipe is formed by multiple layers of different materials and suitable for use in subsea and land-based applications.

18 Claims, 2 Drawing Sheets

U.S. PATENT DOCUMENTS

| | | |
|---|---|---|
| 5,676,175 A | 10/1997 | Bar et al. |
| 5,730,188 A | 3/1998 | Kalman et al. |
| 5,782,506 A | 7/1998 | Uematsu et al. |
| 5,837,083 A * | 11/1998 | Booth ................... 156/158 |
| 5,890,960 A | 4/1999 | Cronan et al. |
| 5,918,641 A | 7/1999 | Hardy et al. |
| 5,921,285 A | 7/1999 | Quigley et al. |
| 5,934,332 A | 8/1999 | Rodriquez et al. |
| 5,934,335 A | 8/1999 | Hardy |
| 6,004,639 A | 12/1999 | Quigley et al. |
| 6,016,845 A | 1/2000 | Quigley et al. |
| 6,016,847 A | 1/2000 | Jung et al. |
| 6,016,848 A | 1/2000 | Egres, Jr. |
| 6,053,213 A | 4/2000 | Jung et al. |
| 6,098,667 A | 8/2000 | Odru |
| 6,123,114 A * | 9/2000 | Seguin et al. ............ 138/124 |
| 6,338,365 B1 * | 1/2002 | Odru ....................... 138/134 |
| 6,390,141 B1 * | 5/2002 | Fisher et al. ............. 138/137 |
| 6,408,891 B1 * | 6/2002 | Jung et al. ................ 138/127 |
| 6,460,389 B1 * | 10/2002 | Ammerling et al. ......... 72/226 |
| 2001/0015233 A1 * | 8/2001 | Herman et al. ............ 138/135 |

FOREIGN PATENT DOCUMENTS

EP     0 937 933 A1    8/1999

* cited by examiner

FLEXIBLE PIPE AND METHOD OF MANUFACTURING SAME

This application is a continuation application of U.S. Ser. No. 09/706,070, filed Nov. 3, 2000, now abandoned which claims priority of provisional application Ser. No. 60/163,908 filed Nov. 5, 1999.

The present invention relates to a relative low-cost flexible pipe formed by multiple layers of different materials and suitable for use in subsea and land-based applications.

DETAILED DESCRIPTION

Figure 1:
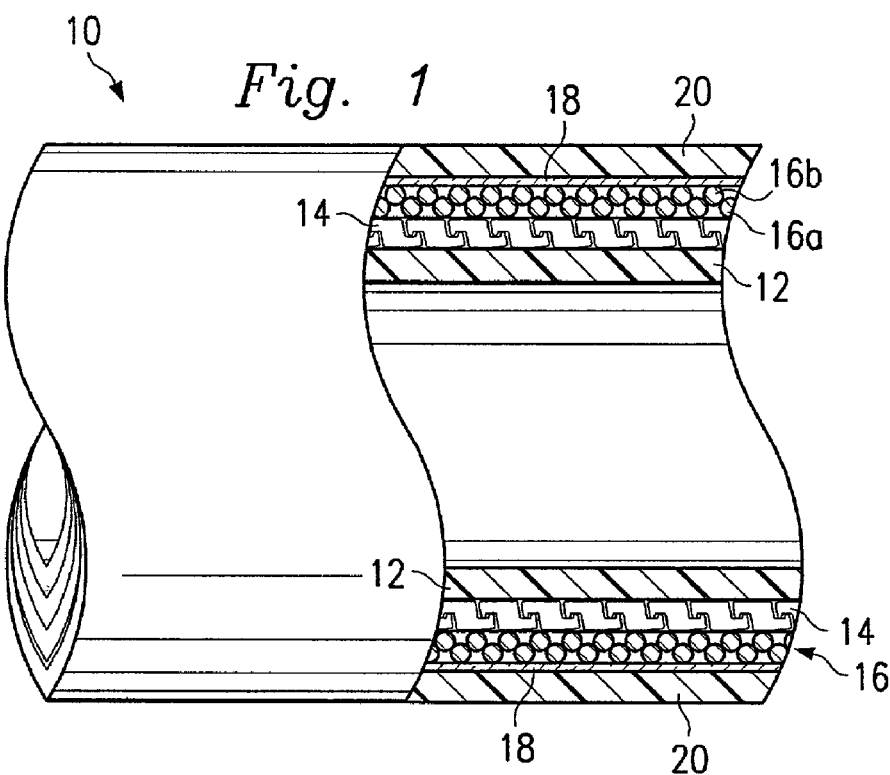
FIG. 1 is a longitudinal sectional view of a flexible pipe according to an embodiment of the present invention.

With reference to FIG. 1, a flexible pipe according to an embodiment of the present invention is shown, in general by the reference numeral 10. The pipe 10 is formed by an inner tubular member, preferably in the form of a plastic sheath 12 for conveying fluid through its bore. The sheath may be formed in a conventional manner using polymers, or the like.

A layer 14 is wrapped around the sheath 12 and provides resistance to internal pressure, hydrostatic collapse and crush. The layer 14 is formed by helically wrapping a continuous metal strip, preferably formed of carbon steel, with adjacent windings being interlocked, to form a flexible layer that provides significant hoop and axial strength. The layer 14 is marketed by the assignee of the present invention, Wellstream, Inc., under the "Flexlok" trademark.

A wrapped wire assembly 16 extends over the layer 14 and consists of a series of wires 16a helically wrapped around the exterior of the layer 14 to form a first tensile layer, and an additional series of wires 16b wrapped around the first series of wires 16a to form a second tensile layer extending over the first tensile layer. The wires 16a and 16b have a substantially circular cross section, and are wound at a relatively high lay angle to provide significant hoop strength and axial strength. Preferably, at least a portion of the wires 16a and 16b are formed by carbon steel with an anodic coating. It is noted that the layer 14 prevents the expansion of the sheath 12 into gaps formed between the wires of the tensile layers 16a and 16b.

One or more layers of a tape 18 are helically wrapped over the wire assembly 16. The tape 18 can be formed by plastic or metal and can be reinforced with glass, metal or a stronger plastic. Although not shown in the drawings, it is understood that the tape 18 can also extend between the layer 14 and the wire assembly 16, and between the series of wires 16a and 16b.

A protective outer insulative sheath 20 extends over the tape 18 and is preferably extruded over the tape 18 in a conventional manner, with the tape providing a smooth surface for the extrusion. The sheath 20 is optional and is required only when the tape 18 is inadequate to protect the remaining components of the pipe 10.

Figure 2:
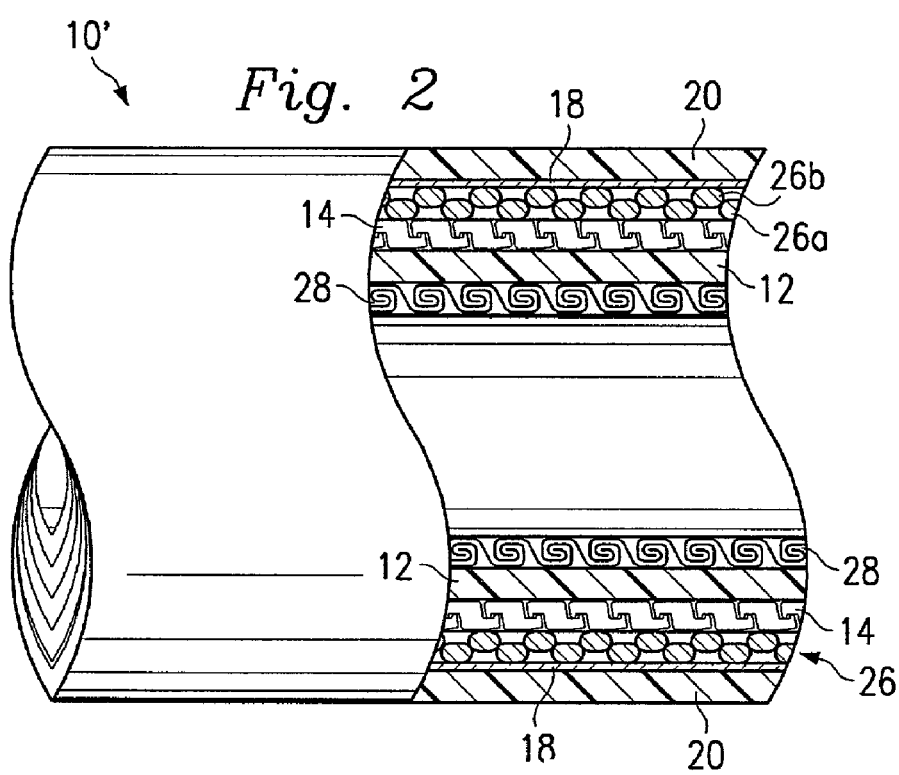
FIG. 2 is a longitudinal sectional view of a flexible pipe according to another embodiment of the present invention.

FIG. 2 depicts a pipe 10' that is similar to the pipe 10 of FIG. 1 and includes some components of FIG. 1 which are given the same reference numerals. In the embodiment of FIG. 2, a wrapped wire assembly 26 extends over the layer 14 and consists of a series of wires 26a and 26b which are substantially rectangular in cross section. The wires 26a are helically wrapped around the exterior of the layer 14 to form a first tensile layer, and the wires 26b wrapped around the first series of wires 26a to form a second tensile layer extending over the first tensile layer.

According to an embodiment of the method of the invention, the rectangular profile of the wires 26a and 26b is achieved by unwinding the coiled wires from a mandrel, or the like, and passing the wires through opposed rollers which flatten the wires to a substantially rectangular cross section.

According to an alternate method of forming the wires 26a and 26b an elongated sheet is payed out from a coil and a plurality of spaced cutters are placed in the path of the sheet to slit the sheet in to a plurality of wires. The cutters are spaced in a manner to form a plurality of wires having a rectangular cross section.

Both of the above methods avoid the high expense of specialized rolling mills in which coils of round carbon steel wire are processed through repeated roll forming and heat treating operations.

Also, in the embodiment of FIG. 2 it is understood that wrapped tape, identical to the tape layer 18, can also extend between the layer 14 and the wire assembly 26, and between the series of wires 26a and 26b.

Also according to the embodiment of FIG. 2, an inner layer 28 is provided inside the sheath 12. The layer 28 is preferably formed by a plurality of helically wrapped, corrugated and/or interlocked strips to provide additional collapse and radial compression resistance. If the layer 28 is added, the sheath 12 would be extruded over the outer surface of the layer 24.

It is emphasized that both the wire assembly 26 and the layer 28 can be included in the pipe 10 and/or 10', or one can be included without the other.

Figure 3A:
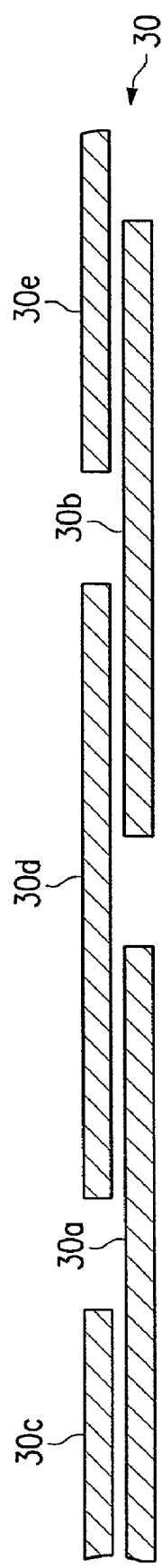
FIGS. 3A–3C are longitudinal sectional views of alternative embodiments of a layer of the pipes of the embodiments of FIGS. 1 and 2.
Figure 3B:
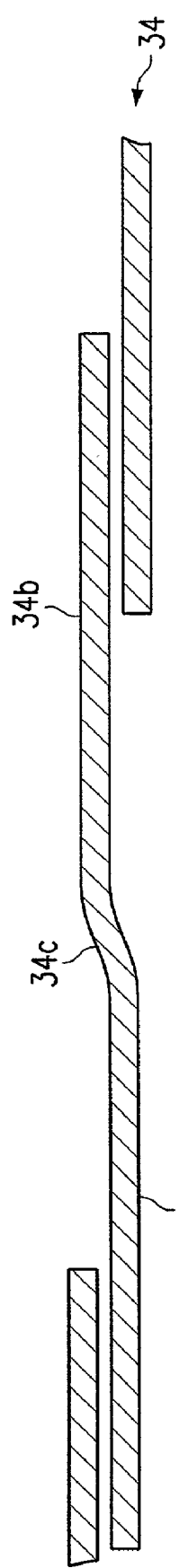
Figure 3C:
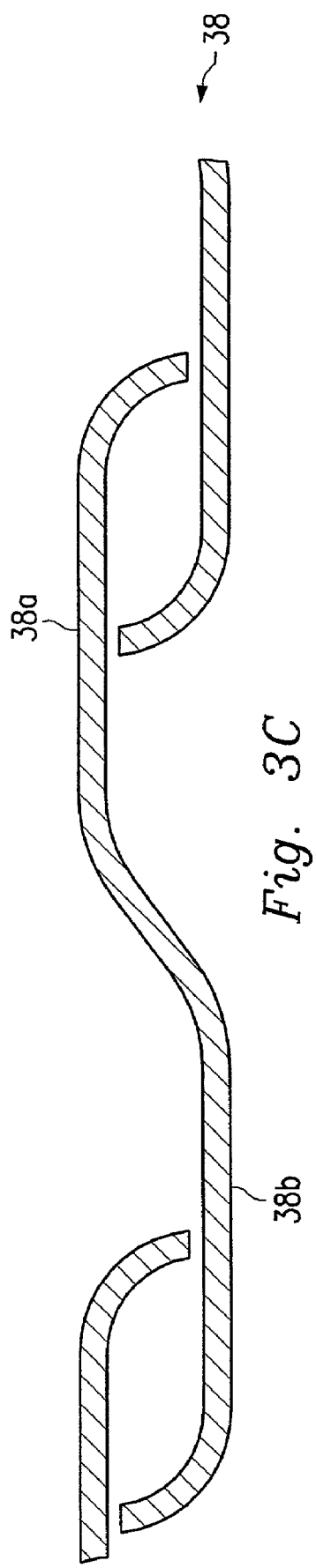

FIGS. 3A–3C are alternative embodiments of the layer 14 which can be used with the pipe 10 and/or the pipe 10'. Referring to FIG. 3A, a continuous metal strip 30, preferably of carbon steel, is helically wrapped around the adjacent inner member (not shown). Two adjacent inner windings are shown by the reference numerals 30a and 30b, and three adjacent outer windings are shown by the reference numerals 30c, 30d, and 30e, respectively. The wrapping of the strip 30 is such that the winding 30d overlaps the windings 30a and 30b, the winding 30c overlaps the winding 30a and its adjacent inner winding (not shown), and the winding 30e overlaps the winding 30b and its adjacent inner winding (not shown), and so on. The strip 30 is wound in this manner for the length of the pipes 10 or 10', and it is understood that the number of radially spaced windings, and therefore the thickness of the layer thus formed can vary.

According to the embodiment of FIG. 3B, a continuous metal strip 34, preferably of carbon steel, is helically wrapped around the adjacent inner member (not shown). The strip 34 is shaped, or formed, in any known manner to form a cross section having a first substantially horizontal inner portion 34a, and second substantially horizontal portion 34b that is spaced radially outwardly from the inner portion 34a, and a bent portion 34c extending between the portions 34a and 34b. The strip 34 is preferably of carbon steel and is helically wrapped around the adjacent inner member (not shown). The wrapping of the strip 34 is such that the portion 34b overlaps the inner portion of its adjacent winding, and the portion 34a is overlapped by the outer portion of its adjacent winding, to thus achieve an interlocking effect. The strip 34 is wrapped for the length of the pipes 10 or 10', and it is understood that the number of radially spaced windings, and therefore the thickness of the layer thus formed can vary.

According to the embodiment of FIG. 3C, a continuous metal strip 38, preferably of carbon steel, is helically wrapped around the adjacent inner member (not shown). The strip 38 is shaped, or formed, in any known manner to form a cross section having a convex portion 38a extending from a concave portion 38b. The wrapping of the strip 38 is such that the convex portion 38a overlaps the concave portion of its adjacent winding and the concave portion 38a is overlapped by the convex portion of its adjacent winding to thus achieve an interlocking effect. The strip 38 is wrapped for the length of the pipes 10 or 10', and it is understood that the number of radially spaced windings, and therefore the thickness of the layer thus formed can vary.

Variations

1. In each of the above embodiments, additional tensile layers of wires can be provided in addition to the series of wires 16a and 16b in the pipe 10 and the series of wires 26a and 26b in the pipe 10'.
2. The carbon steel strip layer 14 can be omitted from each of the above embodiments in which case the first tensile layer 16a would be wound directly onto the sheath 12.
3. If the carbon steel strip is omitted, as discussed in paragraph 2, above, an optional wrapped tape, similar to the tape 18 could be provided that extends between the sheath 12 and the first tensile layer 16a.
4. The adjacent windings of the strip forming the layer 14 do not have to be interlocked.
5. In extremely hostile environments, an outer layer similar to the layer 14 can be placed around the sheath 20 for added protection, in each of the embodiments.
6. In extremely hostile environments, an outer layer similar to the layer 14 can be placed around the sheath 20 for added protection.

It is understood that spatial references, such as "under", "over", "between", "outer", "inner" and "surrounding" are for the purpose of illustration only and do not limit the specific orientation or location of the layers described above.

Since other modifications, changes, and substitutions are intended in the foregoing disclosure, it is appropriate that the appended claims be construed broadly and in a manner consistent with the scope of the invention.

What is claimed is:

1. A flexible pipe comprising:
    a tubular member defining a longitudinal passage;
    a single metal strip continuously helically wound over the tubular member to define a plurality of radially spaced, integral windings, the strip having a constant thickness throughout its length and width;
    a cross section of the strip being preformed prior to being wound over the tubular member and having a convex portion comprising a first, curved bent region at an edge of the strip and a straight portion extending from the first bent region to a curved, bent portion of the strip, and a concave portion comprising a second, curved bent region at the other edge of the strip and a straight portion extending from the second bent region to the bent portion of the strip, said convex portion and said concave portion being integrally formed;
    the convex portion of each winding of the strip overlapping a portion of the concave portion of one adjacent winding, and the concave portion of each winding being overlapped by the convex portion of another adjacent winding which is in a spaced relation to the one adjacent winding, to interlock the windings;
    a layer of wires wrapped around the exterior of the metal strip; and
    an outer sheath extending over the metal strip and the layer of wires.

2. The pipe of claim 1 further comprising an additional layer of wires wrapped around the first-mentioned layer of wires.

3. The pipe of claim 2 wherein each of the wires is substantially circular in cross section.

4. The pipe of claim 2 wherein each of the wires is substantially rectangular in cross section.

5. The pipe of claim 2 further comprising a layer of tape wrapped around at least one layer of wires.

6. The pipe of claim 1 further comprising an inner layer disposed within the tubular member and comprising a plurality of helically wrapped metal strips to provide collapse and radial compression resistance.

7. The pipe of claim 1 further comprising at least one layer of tape wrapped around the metal strip and interposed between the metal strip and the layer of wires.

8. A flexible pipe made by a process comprising:
    providing a tubular member defining a longitudinal passage;
    providing a preformed metal strip having a constant thickness throughout its length and width and a cross section comprising a convex portion and a concave portion, the convex portion comprising a first bent edge portion and a substantially straight portion extending from the first edge portion to an intermediate bent portion of the strip, the concave portion comprising a second bent edge portion and a substantially straight portion extending from the second edge portion to the intermediate bent portion of the strip, said convex portion and said concave portion being integrally formed;
    helically winding the preformed metal strip over the tubular member to define a plurality of radially spaced, integral windings, wherein the convex portion of each winding of the strip overlaps a portion of the concave portion of one adjacent winding, and the concave portion of each winding is overlapped by the convex portion of another adjacent winding which is in a spaced relation to the one adjacent winding, to interlock the windings; and placing an outer sheath over the helically wound metal strip.

9. The pipe of claim 8 wherein the process further comprises forming at least one layer of wires around the helically wound metal strip.

10. The pipe of claim 9 wherein the process further comprises forming a layer of tape around the at least one layer of wires.

11. The pipe of claim 9 wherein the process further comprises forming at least one layer of tape on the metal strip prior to forming the at least one layer of wires.

12. The pipe of claim 8 wherein the act of providing a tubular member further comprises forming the tubular member over an inner layer comprising a plurality of helically wrapped metal strips to provide collapse and radial compression resistance to the pipe.

13. The pipe of claim 8 wherein the first and second edge portions and the intermediate bent portion are curved.

14. A flexible pipe made by a process comprising:
    providing a tubular member defining a longitudinal passage;

providing a preformed metal strip having a constant thickness throughout its length and width and a cross section comprising a raised substantially horizontal first portion extending from a first edge of the strip to a bent portion of the strip and a substantially horizontal second portion, formed integral with said raised first portion and said bent portion, and extending from the bent portion of the strip to a second edge the strip;

helically winding the preformed metal strip over the tubular member to define a plurality of radially spaced, integral windings, wherein the raised first portion of each winding of the strip overlaps a portion of the second portion of one adjacent winding, and the second portion of each winding is overlapped by the raised first portion of another adjacent winding which is in a spaced relation to the one adjacent winding, to interlock the windings; and placing an outer sheath over the helically wound metal strip.

15. The pipe of claim 14 wherein the process further comprises forming at least one layer of wires around the helically wound metal strip.

16. The pipe of claim 15 wherein the process further comprises forming a layer of tape around the at least one layer of wires.

17. The pipe of claim 15 wherein the process further comprises forming at least one layer of tape on the metal strip prior to forming the at least one layer of wires.

18. The pipe of claim 14 wherein the act of providing a tubular member further comprises forming the tubular member over an inner layer comprising a plurality of helically wrapped metal strips to provide collapse and radial compression resistance to the pipe.

* * * * *